United States Patent Office 3,327,017
Patented June 20, 1967

3,327,017
MOLDING COMPOSITION COMPRISING A THERMOSETTING AROMATIC HYDROCARBON-ALDEHYDE-PHENOL RESIN AND A THERMOPLASTIC LINEAR POLYMER
Ching Yun Huang, Minoo-shi, Susumu Kunimoto, Nishinomiya-shi, Kazuo Ueno, Ibaragi-shi, and Takashi Yoshimitsu, Suita-shi, Japan, assignors to Japan Gas Chemical Company, Inc., Tokyo, Japan, a corporation of Japan
No Drawing. Filed Sept. 30, 1964, Ser. No. 400,576
Claims priority, application Japan, Oct. 3, 1963, 38/53,259
18 Claims. (Cl. 260—844)

This invention relates to a novel composition and a method for producing the same. More particularly it relates to a novel composition consisting essentially of a thermosetting aromatic hydrocarbon aldehyde phenol resin and a thermoplastic linear polymer having retained characteristic properties of both resins.

When a thermosetting resin such as phenol resin, melamine resin, urea resin or the like is used for molding, it has been necessary to blend with such a reinforcement material as wood flour, asbestos, pulp, glass fibers or the like. It is a well known fact that a thermosetting resin alone cannot afford sufficient mechanical strength especially impact strength to molded products. Without such reinforcement, only brittle products are produced.

On the other hand a thermoplastic resin such as polymethyl methacrylate, polystyrene, polyvinyl chloride or the like is superior in the properties of impact resistance, tensile strength, electrical insulation, but inferior to thermosetting resin in the properties of heat resistance and hardness. It has been, therefore a strong and continuing desire in the field of high polymers to produce a resin having a combination of superior properties, in other words a resin in which the brittleness of thermosetting resin and the heat resistance of thermoplastic resin are improved. As a method for producing a resin having above-mentioned ideal properties the mixing of two types of resin may be an idea hit upon everybody. However the most important problem in this case is a compatibility of the two. The mixing of two substances having no mutual compatibility not only fails to exhibit characteristic properties of the two, but inversely cancels them each other and brings about drastic deterioration.

As a customary thermosetting resin such as phenol resin, melamine resin, urea resin or the like has no compatibility with a thermosetting resin such as polymethyl methacrylate, polystyrene, polyvinyl chloride or the like at all, it is believed to be impossible to produce a molding material by mixing intimately a thermosetting and a thermoplastic resin. Accordingly there has been never such a molding material as based upon the above-mentioned idea marketed.

An object of the present invention is to provide a resin retaining characteristic properties of thermosetting and thermoplastic resins.

Another object of the present invention is to provide a method for producing a resin in which thermosetting and thermoplastic ingredients are intimately mixed and fused together to make the best of characteristic properties of the said ingredients.

These and other objects can be attained by the present invention. According to the present invention, a thermoplastic resin such as polymethyl methacrylate, polystyrene and polyvinyl chloride are intimately mixed and fused together with a thermosetting aromatic hydrocarbon aldehyde phenol resin.

This invention is based upon the surprising fact found after an extensive study that a thermosetting aromatic hydrocarbon aldehyde phenol resin is compatible at every mixing ratio with above-mentioned thermoplastic resins, in spite of the fact that customary thermosetting resin such as phenol resin, urea resin or the like is not compatible with above-mentioned thermoplastic resins.

The reason for compatibility of an aromatic hydrocarbon aldehyde phenol resin with thermoplastic resins can be understood from the point of polarity. According to P. S. Small et al. [e.g. Journal of the applied Chemistry 3,71~80 (1948)] the closer the solubility parameters (abbreviated hereinafter as SP) of two substances are, so much closer are the polarities and so much better is the compatibility of two substances. An additive rule of SP holds in the case of more than two kinds of mixture. The reason for compatibility of an aromatic hydrocarbon aldehyde phenol resin with thermoplastic resins may be due to the identity of both S.P. SP values of representative substances related to the present invention are shown in Table 1.

TABLE 1

| Substance | SP |
|---|---|
| Polyvinyl chloride | 9.5 |
| Polystyrene | 9.1 |
| Polymethylmethacrylate | 9.3 |
| Phenol | 14.5 |
| m-Cresol | 11.4 |
| Benzene | 9.2 |
| Toluene | 8.9 |
| m-Xylene | 8.9 |
| Methanol | 14.8 |
| Water | 23.4 |

An aromatic hydrocarbon aldehyde phenol resin used in the present invention is produced by the reaction of an aromatic hydrocarbon aldehyde resin with a phenol group compound, and has a structure in which phenols and aromatic hydrocarbons are mutually bonded by methylene radicals i.e. a structure of phenol resin in which most of the phenol nucleus are replaced by aromatic hydrocarbon nucleus. As the structures of polycondensate of aldehyde such as phenol resin, aromatic hydrocarbon aldehyde phenol resin, etc. are not fixed, it is impossible to calculate even their approximate values of SP.

However there is a great difference between the SP values of phenol, the raw material for phenol resin and of aromatic hydrocarbon the raw material for aromatic hydro carbon aldehyde phenol resin. From the additive rule the SP of aromatic hydrocarbon aldehyde phenol resin is considered to be in the middle of from the SP of phenol resin to that of aromatic hydrocarbon aldehyde resin. On the other hand, the SP of thermoplastic resins used in the present invention is, in general, exceedingly low, compared with the SP of phenol and cresol, but somewhat higher than that of aromatic hydrocarbon.

It lies between the SP of phenol and aromatic hydrocarbon just like aromatic hydrocarbon aldehyde phenol resin. Accordingly the thermoplastic resin such as polymethylmethacrylate, polystyrene, polyvinyl chloride or the like is compatible with the aromatic hydrocarbon aldehyde phenol resin and the molding material of the present invention affords shaped articles having novel properties which cannot be anticipated from conventional thermosetting or thermoplastic resins.

The above-mentioned relation can be more fully understood from the simpler case as follows.

Phenol resins are soluble in methanol. Methanol has a fairly high SP value. Melamine resins and urea resins are soluble in water the SP of which is larger than methanol. On the other hand aromatic hydrocarbon aldehyde phenol resins are insoluble not only in water but also in methanol. This resin is soluble in solvents, the SP of which occupies a position rather close to the aromatic hydrocarbon side on a line connecting the points corresponding to the SP of aromatic hydrocarbon and that of phenol.

The aromatic hydrocarbon aldehyde phenol resin useful for producing molding composition of the present invention is obtained by effecting the polycondensation of an aromatic hydrocarbon aldehyde resin such as benzene formaldehyde resin, toluene formaldehyde resin, xylene acetaldehyde resin, durene formaldehyde resin, methylnaphthalene formaldehyde resin, or the like with a phenol group compound having at least three functionality such as phenol, cresol, xylenol, bisphenol A or the like or formaldehyde derivatives thereof, or a mixture of above-mentioned phenol group compound having at least three functionality with less than 50 percent by weight of phenol group compound having two functionality such as p-cresol, p-tertiary butylphenol catechol or the like. In this case the aromatic hydrocarbon aldehyde resin is a solid resin having from 3 to 18 oxygen content by weight and a viscosity ranging from a high value to a low value and is produced from an aromatic hydrocarbon such as benzene, toluene, xylene, mesitylene, durene, naphthalene, methylnaphthalene or the like by subjecting it to polycondensation with an aliphatic aldehyde having 4 or less than 4 carbon atoms such as formaldehyde, acetaldehyde, butylaldehyde or the like.

When an aromatic hydrocarbon aldehyde phenol resin contains unreacted phenol or the like after polycondensation reaction, it is possible to advance the polycondensation with aldehyde compounds such as formaldehyde, acetaldehyde or the like in the presence of an acidic catalyst. These resins correspond to novolak type of phenol resin and by mixing with hexamethylene tetramine followed by heating, they can be converted to cured resins. When an aromatic hydrocarbon aldehyde resin and phenol compound are subjected to polycondensation and further subjected to polycondensation with formaldehyde in the presence of alkaline catalyst, resins which correspond to resol type of phenol resin are obtained. In this case hexamethylene tetramine as a curing agent is not required, and cured resins are obtained by heating alone. The polarity of aromatic hydrocarbon aldehyde phenol resin varies somewhat according to the kind of aromatic hydrocarbon used as a raw material in its manufacture, but as is clear from SP values in Table 1 the variation is not so large as to be substantial. On the other hand phenol compounds possess a high level of SP value. Accordingly it is possible to dissolve an aromatic hydrocarbon aldehyde phenol resin prepared at a fairly wide range of manufacturing condition into a thermoplastic resin such as polymethyl methacrylate, polystyrene, polyvinyl chloride, or the like but an aromatic hydrocarbon aldehyde phenol resin which is prepared by reacting 100 parts by weight of an aromatic hydrocarbon aldehyde resin with from 50 to 300 parts by weight of phenol group compound is preferable. An aromatic hydrocarbon aldehyde phenol resin prepared by the reaction with less than 50 parts by weight of phenol group compound has a lower curing percentage and a lower percentage increase of heat distortion temperature of shaped articles. A resin prepared by the reaction with more than 300 parts of phenol compound has a lower compatibility with above-mentioned thermoplastic resins.

As a thermoplastic resin useful for the molding composition of the present invention, the one which has the SP value of from 9 to 10 is preferable, namely a thermoplastic linear polymer such as polymethylmethacrylate, polystyrene, polyvinyl chloride or the like, or a copolymer thereof or a polymer of derivative of the foregoing polymers is singly or as a mixture used.

In preparing the molding composition of the present invention, the above-mentioned aromatic hydrocarbon aldehyde phenol resin is mixed with a thermoplastic resin and subjected to kneading for mutually disolving the ingredients by use of rolls a co-kneader or the like. When a novolak type resin is to be used as an aromatic hydrocarbon aldehyde phenol resin, it is general procedure that three ingredients, i.e. an aromatic hydrocarbon aldehyde phenol resin, a hexamethylene tetramine and a thermoplastic resin are mixed in powder forms, kneaded on rolls at a temperature of from 100° C. to 150° C. to advance the curing reaction to a suitable extent, taking from the rolls and ground to molding powder. However it is also possible to carry out kneading without previous mixing of the three ingredients, i.e. the mixing can be done one ingredient after another while continuing the kneading. It is also possible to add hexamethylene tetramine to the ground powder of aromatic hydrocarbon aldehyde phenol resin previously mixed and kneaded with thermoplastic resin. When a resol type resin is to be used as an aromatic hydrocarbon aldehyde phenol resin, and the said resin is solid, the procedure as in the case of novolak type resin can be adopted, but it is not necessary to add hexamethylene tetramine. When the said resin is a varnish in which the said resin is dissolved in a solvent the solvent is evaporated by a suitable method after mixing with a powdered thermoplastic resin and prior to kneading on the rolls. It is also possible to evaporate solvent during the period of kneading. If required, suitable fillers, colorants or other assistants can be incorporated therewith.

The molding composition of the present invention possess numerous advantages which cannot be realized by any conventional resins.

The present molding composition undergoes heat curing during the time of molding. At the early stage of heating, an aromatic hydrocarbon aldehyde phenol resin performs a function of plasticizer against a thermoplastic resin by which the processing property of the latter is extremely improved even when a small amount of the former is incorporated therewith. On the other hand a thermoplastic resin imparts a characteristic property of thermoplastic resin i.e. fluidity to a thermosetting aromatic hydrocarbon aldehyde phenol resin. On account of this, the injection molding or the extrusion molding of thermoplastic resin has now become possible by use of present molding composition.

It is another advantage of the present invention that the ratio of two ingredients can be taken any desired value.

If the defects such as heat resistance, hardness, etc., are neglected a thermoplastic resin used in the present molding composition such as polymethyl methacrylate, polystyrene, polyvinyl chloride or the like is originally useful by itself for molding products.

Accordingly it can be added to an aromatic hydrocarbon aldehyde phenol resin in any amount. On the other hand, other conventional additives to thermosetting resins e.g. rubber-like substances cannot add too much because they reduce the hardness and the shaped articles made therefrom lose their practical value. On this account about the same amount of rubber as a thermosetting resin is considered to be the limit of addition. There is no such a disadvantage in the present molding composition. Even when an amount of thermoplastic resin is large, a shaped article having notably improved heat resistance can be produced. On the contrary, even when an amount of aromatic hydrocarbon aldehyde phenol resin is large, a shaped article having excellent mechanical strength can be produced without using a reinforcement material such as wood flour, pulp or the like which is the necessity for general thermosetting resin. The ratio of a thermosetting aromatic hydrocarbon aldehyde phenol resin and a polymethyl methacrylate, polystyrene or polyvinyl chloride in the present invention should be 80 to 20% by weight of the thermoplastic resin per 20 to 80% by weight of the aromatic hydrocarbon aldehyde phenol resin, in view of the properties of the molded articles.

According to the present invention, the heat resistance and the hardness of polymethyl methacrylate, polystyrene, polyvinyl chloride or the like are surprisingly improved. For example, heat distortion temperature and hardness of the shaped articles molded according to the present invention are shown in the Table 2 in comparison with the same articles made of polyvinyl chloride. In this case, the molding composition is made as follows. 100 parts by weight of xylene formaldehyde resin (oxygen content 10.7 percent by weight, molecular weight 480) and 60 parts by weight of phenol are reacted to produce a xylene formaldehyde phenol resin. Resulting resin is ground into powder and admixed with polyvinyl chloride (molecular weight 1300) and hexamethylene tetramine in an amount of 10 percent by weight vz. xylene formaldehyde phenol resin. Resulting mixture is kneaded on rolls at a surface temperature of 120° C. to bring the ingredients into mutual dissolved state.

TABLE 2

| Mixing ratio (by weight) | | Heat distortion temperature, °C. | Hardness (Rockwell) |
|---|---|---|---|
| Polyvinyl chloride | Xylene formaldehyde phenol resin | | |
| 100 | 0 | 86 | M61 |
| 80 | 20 | 101 | M76 |
| 60 | 40 | 112 | M93 |
| 40 | 60 | 124 | M101 |
| 20 | 80 | 134 | M112 |

In general shaped articles made of a thermoplastic resin such as polymethyl methacrylate, polystyrene, polyvinyl chloride or the like have the heat distortion temperature lower than 90° C. and are readily deformed by boiling water. Whereas the shaped articles made of present molding composition withstands boiling water on account of increased heat distortion temperature. This means the present invention has opened up new fields of application which have been shut off for conventional thermoplastic resins.

In regard to the water resistance, alkali resistance, acid resistance, electric insulation, and percentage shrinkage at molding, the aromatic hydrocarbon aldehyde phenol resin is relatively superior among thermosetting resins, but considerably inferior to the thermoplastic resins such as polymethyl methacrylate, polystyrene and polyvinyl chloride. The present molding composition improves exceedingly such properties of aromatic hydrocarbon aldehyde phenol resin as the resistance to chemicals, electric insulation, molding shrinkage, and affords practical products having remarkably high impact resistance property without any reinforcement material such as wood flour, pulp, asbestos or the like. As indicated in Table 3 the present molding composition prepared by mixing toluene phenol resin hexamethylene tetramine and polyvinyl chloride and bringing them into mutually dissolved state, improves the properties of thermosetting toluene formaldehyde phenol resin.

In general thermosetting resins have been incorporated with inexpensive cellulosic fillers such as wood flour, pulp, or the like for the purpose of improving mechanical strength, and reducing production cost. However hydrophilic fillers frequently become the origin of water absorption which incurs the reduction of electric insulation after being boiled in water. If a relatively inexpensive thermoplastic resin such as polyvinyl chloride is used in the present molding composition, it is possible to provide an aromatic hydrocarbon aldehyde phenol resin with high electric insulating and high water resistant properties without accompanying cost increase.

As is clear from the foregoing, the molding composition of the present invention has enabled to perform the combination of thermoplastic resins and thermosetting resins which has been considered utterly impossible. It has excellent processability and shaped articles made therefrom have such numerous characteristic properties as no other conventional resins have ever shown. In addition aromatic hydrocarbons as the starting materials for producing the molding composition of the present invention are now available abundantly at relatively inexpensive price from growing petrochemical industry, the application of the present molding composition in wide spread uses will be opened in near future.

In order that those skilled in the art may more fully understand the nature of my invention and the method of carrying it out, the following examples are given.

*Example 1*

A benzene formaldehyde phenol resin (softening point 61° C.) was obtained by reacting 500 parts by weight of benzene formaldehyde resin (oxygen content 10.3 percent), 350 parts by weight of phenol and 0.3 parts by weight of p-toluene sulfonic acid at a temperature of 120° C. for 2 hours and at a temperature of 150° C. for 30 minutes. To 100 parts by weight of this resin, 8 parts by weight of hexamethylene tetramine, 100 parts by weight of polymethacrylate (molding grade) were added and kneaded on rolls maintained at a temperature of from 110° C. to 120° C. in advance for 10 minutes. After taking out from rolls the compounded product is ground, and subjected to the compression molding at a pressure of 150 kg./cm² and a temperature of 150° C. for 7 minutes. Another shaped article was by the same procedure except that 200 parts by weight of polymethyl methacrylate was used instead of 100 parts by weight. The heat distortion temperature and hardness obtained are shown in the following table in which (I) was prepared from the composition containing 100 parts by weight of polymethyl methacrylate and (II) was prepared from the composition containing 200 parts by weight.

| | Heat deformation temperature (ASTM D648-56) | Rockwell hardness (ASTM D785-51) |
|---|---|---|
| Polymethyl methacrylate shaped article | 81 | M87 |
| Shaped article (I) | 116 | M109 |
| Shaped article (II) | 103 | M98 |

TABLE 3

| Mixing ratio (by weight) | | Impact resistance (kg.-cm./cm.²) | Percentage shrinkage at molding (1/1000) | Insulation resistance, ω | |
|---|---|---|---|---|---|
| Toluene formaldehyde phenol resin | Polyvinyl chloride | | | At normal state | After boiling |
| 80 | 20 | 4.1 | 4.2 | $4.6 \times 10^{15}$ | $1.9 \times 10^{14}$ |
| 60 | 40 | 6.3 | 2.1 | $>10^{16}$ | $3.2 \times 10^{15}$ |
| 40 | 60 | 7.6 | 1.7 | $>10^{16}$ | $17.8 \times 10^{14}$ |
| 20 | 80 | 8.1 | 1.3 | $>10^{16}$ | $1.5 \times 10^{14}$ |
| Toluene formaldehyde phenol resin incorporated with wood flour | | 2.7 | 6.1 | $3.5 \times 10^{12}$ | $7.1 \times 10^{8}$ |

Example 2

500 parts by weight of toluene formaldehyde resin (oxygen content 16.1 percent by weight), 120 parts by weight of m-cresol and 0.5 parts by weight of p-toluene sulfonic acid were mixed and reacted at a temperature of from 110° C. to 120° C. for 1 hour. To this reaction mixture, 300 parts by weight of formalin and 11.6 parts by weight of 1 normal hydrochloric acid and brought into reaction under reflux for 2 hours. After the reaction was completed, the reaction mixture was concentrated by dehydration while raising the temperature up to 160° C., which a toluene formaldehyde cresol resin having a softening temperature of 75° C. was obtained. To 100 parts by weight of resulting resin, 10 parts by weight of hexamethylene tetramine and 80 parts by weight of polyvinyl chloride (polymerization degree 1300) were admixed, processed by rolls as in Example 1 and subjected to compression molding at a pressure of 200 kg./cm.$^2$, at a temperature of 150° C. for 7 minutes. On the other hand, to 100 parts by weight of toluene formaldehyde cresol resin obtained by the method of this example, 80 parts by weight of wood flour, 10 parts by weight of hexamethylene tetramine and 1 part by weight of stearic acid were admixed and subjected to the same rolls processing and compression molding as the foregoing case. Comparing the properties of each molded product, the following result was obtained.

|  | Shaped article produced according to the present invention | Shaped article filled with wood flour |
| --- | --- | --- |
| Flexural strength (kg./mm.$^2$) | 8.7 | 8.3 |
| Impact value (Charpy kg.cm./cm.$^2$) | 2.5 | 2.3 |
| Insulating resistance (normal state) | >10$^{16}$ | 4.7×10$^{12}$ |
| Insulating resistance (after boiling for two hours) | 1.8×10$^{15}$ | 6.3×10$^8$ |
| Molding shrinkage (1/1000) | 2.3 | 5.1 |
| Heat distortion temperature (° C.) | 121 | 137 |

Example 3

A mixture of 1000 parts by weight of xylene formaldehyde resin (oxygen content 12.6 percent by weight), 1500 parts by weight of phenol and 1 part by weight of p-toluene sulfonic acid were reacted at a temperature of 20° C. for 1 hour. 2000 parts by weight of formalin and 200 parts by weight of 2.8 percent (by weight) aqueous ammonia were added to the above-mentioned reaction mixture and brought into reaction while refluxing for 1 hour. While maintaining the temperature of the content at 80° C., dehydration was performed at a reduced pressure by which a solid resol type xylene phenol resin having a softening point of 51° C. was obtained. To 200 parts by weight of resol type xylene formaldehyde phenol resin 10,000 parts by weight of polyvinyl chloride (polymerization degree 900), 500 parts by weight of a commercial stabilizer, composition consisting of cadmium stearate and barium stearate, 200 parts by weight of lubricant were admixed in the form of fine powders. The mixture was extruded from a die of a screw extruder having hollow grooves at a barrel temperature of 150° C. to 180° C. and at a die temperature of 170° C., passed through a cooling vessel of from 20° C. to 25° C. and made into pellets by use of a pelletizer. Resulting pale yellow pellets were subjected to compression molding at a molding pressure of 150 kg./cm.$^2$ and at a molding temperature of 70° C. for 3 minutes. Resulting molded products showed the following heat distortion temperature.

Heat distortion temperature (° C.)
Shaped article according to the present invention ___ 102
Shaped article made from polyvinyl chloride _____ 76

Example 4

A mixture of 500 parts by weight of xylene acetaldehyde resin (oxygen content 7.7 percent by weight), 100 parts by weight of p-tertiary butylphenol, 150 parts by weight of phenol, and 0.5 parts by weight of m-xylene sulfonic acid were reacted while gradually raising the temperature up to 150° C. in 5 hours, by which a brown resin having a softening point of 80° C. was obtained. To 100 parts by weight of this resin, 200 parts by weight of polystyrene (molding grade), and 10 parts by weight of hexamethylene tetramine were added and kneaded on rolls as in Example 1. The resulting product was ground to make into molding material which was subjected to compression molding at a molding pressure of 100 kg./cm.$^2$ and at a temperature of 150° C. for 10 minutes. The molded articles showed the following heat distortion temperature.

|  | Heat distortion temperature (°C.) | Rockwell hardness |
| --- | --- | --- |
| Shaped article according to the present invention | 111 | M87 |
| Shaped article made from polystyrene | 84 | M72 |

Example 5

A mixture of 500 parts by weight of durene formaldehyde resin (oxygen content 8.4 percent by weight), 500 parts by weight of m-cresol and 0.5 parts by weight of p-toluene sulfonic acid was reacted at a temperature of 110° C. to 120° C. for 90 minutes. Subsequently 300 parts by weight of formalin and 23.2 parts by weight of 1 normal hydrochloric acid were added to the above-mentioned reaction mixture and brought into reaction while refluxing for 2 hours. After the reaction was completed, the dehydration concentration was performed by which a durene formaldehyde cresol resin having a softening point of 78° C. was obtained. To 500 parts by weights of this resin, 50 parts by weight of polymethyl methacrylate, 50 parts by weight of acrylonitrile-butadiene-styrene copolymer and 30 parts by weight of hexamethylene tetramine were added, and kneaded on rolls at a temperature of 120° C. for 12 minutes. The compound removed from the rolls was ground and subjected to compression molding at a temperature of 160° C. and at a pressure of 150 kg./cm.$^2$ for 5 minutes. The properties of resulting molded products was as follows.

|  | Shaped article produced according to the present invention | Durene formaldehyde cresol resin filled with wood flour |
| --- | --- | --- |
| Flexural strength (kg./mm.$^2$) | 12.1 | 9.1 |
| Impact value (Charpy kg.cm./mm.$^2$). | 9.7 | 2.3 |
| Insulating resistance (normal state), Ω | 2.6×10$^{15}$ | 6.3×10$^{12}$ |
| Insulating resistance (after boiling for two hours), Ω | 4.4×10$^{14}$ | 2.4×10$^9$ |
| Molding shrinkage (1/1000) | 4.2 | 6.2 |
| Percentage water absorption (percent) | 0.17 | 0.52 |
| Hardness (Rockwell) | M107 | M118 |
| Resistance to alkali (20 per cent caustic soda 60° C., 24 hr.) | (¹) | (²) |

¹ No appreciable change.   ² Slightly discolored.

What is claimed is:
1. A novel composition of matter for molding consisting of from 20 to 80% by weight of polymethyl methacrylate and from 80 to 20% by weight of a thermosetting aromatic hydrocarbon aldehyde phenol resin which is produced by polycondensation of 100 parts by weight of an aromatic hydrocarbon aldehyde resin with from 50 to 300 parts by weight of a member selected from the group consisting of a phenol group compound having at least three functionality, formaldehyde derivatives thereof, and a mixture of a phenol group compound having at least three functionality and less than 50 percent by weight of a phenol group compound having two functionality.

2. A novel composition of matter for molding consisting of from 20 to 80% by weight of polystyrene and from 80 to 20% by weight of a thermosetting aromatic hydrocarbon aldehyde phenol resin which is produced by polycondensation of 100 parts by weight of an aromatic hydrocarbon aldehyde resin with from 50 to 300 parts by weight of a member selected from the group consisting of a phenol group compound having at least three functionality, formaldehyde derivatives thereof, and a mixture of a phenol group compound having at least three functionality and less than 60 percent by weight of a phenol group compound having two functionality.

3. A novel composition of matter for molding consisting of from 20 to 80% by weight of polyvinyl chloride and from 80 to 20% by weight of a thermosetting aromatic hydrocarbon aldehyde phenol resin which is produced by polycondensation of 100 parts by weight of an aromatic hydrocarbon aldehyde resin with 50 to 300 parts by weight of a member selected from the group consisting of a phenol group compound having at least three functionality, formaldehyde derivatives thereof, and a mixture of a phenol group compound having at least three functionality and less than 50 percent by weight of a phenol group compound having two functionality.

4. A novel composition of matter according to claim 1 in which an aromatic hydrocarbon aldehyde resin is a poly-condensate containing from 8 to 18 percent by weight of oxygen which is produced by the reaction of aromatic hydrocarbon selected from the group consisting of benzene, toluene, xylene, mesitylene, durene, naphthalene and methylnaphthalene with an aliphatic aldehyde having at the highest 4 carbon atoms.

5. A novel composition of matter according to claim 2 in which an aromatic hydrocarbon aldehyde resin is a poly-condensate containing from 8 to 18 percent by weight of oxygen which is produced by the reaction of aromatic hydrocarbon selected from the group consisting of benzene, toluene, xylene, mesitylene, durene, naphthalene and methylnaphthalene with an aliphatic aldehyde having at the highest 4 carbon atoms.

6. A novel composition of matter according to claim 3 in which an aromatic hydrocarbon aldehyde resin is a poly-condensate containing from 8 to 18 percent by weight of oxygen which is produced by the reaction of an aromatic hydrocarbon selected from the group consisting of benzene, toluene, xylene, mesitylene, durene, naphthalene, and methylnaphthalene with an aliphatic aldehyde having at the highest 4 carbon atoms.

7. A novel composition of matter according to claim 1 in which a phenol group compound having at least three functionality is a member selected from the group consisting of phenol cresol, xylenol and bisphenol A.

8. A novel composition of matter according to claim 2 in which a phenol group compound having at least three functionality is a member selected from the group consisting of phenol, cresol, xylenol and bisphenol A.

9. A novel composition of matter according to claim 3 in which a phenol group compound having at least three functionality is a member selected from the group consisting of phenol, cresol, xylenol and bisphenol A.

10. A novel composition of matter according to claim 1 in which a phenol group compound having two functionality is a member selected from the group consisting of p-cresol, p-tertiary butylphenol and catechol.

11. A novel composition of matter according to claim 2 in which a phenol group compound having two functionality is a member selected from the group consisting of p-cresol, p-tertiary butylphenol and catechol.

12. A novel composition of matter according to claim 3 in which a phenol group compound having two functionality is a member selected from the group consisting of p-cresol, p-tertiary butylphenol and catechol.

13. A method for producing a molding composition which comprises mixing a thermoplastic resin selected from the group consisting of polymethyl methacrylate, polystyrene and polyvinyl chloride and a novolak type thermosetting aromatic hydrocarbon aldehyde phenol resin and hexamethylene tetramine and heating the said mixture at a temperature of from 100° C. to 180° C. the said thermosetting aromatic hydrocarbon aldehyde phenol resin being produced by the reaction of 100 parts by weight of aromatic hydrocarbon aldehyde resin with from 50 to 300 parts by weight of a phenol group compound.

14. A method for producing a molding composition which comprises mixing a thermoplastic resin selected from the group consisting of polymethyl methacrylate, polystyrene and polyvinyl chloride and a resol type thermosetting aromatic hydrocarbon aldehyde phenol resin and heating the said mixture at a temperature of 100° C. to 180° C. the said thermosetting aromatic hydrocarbon aldehyde phenol resin being produced by reacting 100 parts by weight of aromatic hydrocarbon aldehyde resin with from 50 to 300 parts by weight of a phenol group compound, and further reacting the resulting product with formaldehyde under a basic condition.

15. A novel composition of matter capable to produce a molded product having a heat distortion temperature higher than 100° C. and a Rockwell hardness higher than M76 consisting essentially of from 20 to 80 percent by weight of polyvinyl chloride and from 80 to 20 percent by weight of xylene phenol resin which is produced from 100 parts by weight of xylene formaldehyde resin and from 60 to 150 parts by weight of phenol.

16. A novel composition of matter capable of producing a molded product having an insulation resistance higher than $10^{15}\Omega$, impact value of more than 4.1 kg.cm./cm.$^2$ by Charpy and molding shrinkage of less 4.2/1000 consisting essentially of from 80 to 20 parts by weight of toluene phenol resin which is produced from 100 parts by weight of toluene formaldehyde resin and 60 to 150 parts by weight of phenol and 20 to 80 parts by weight of polyvinyl chloride.

17. A novel composition of matter capable of producing a molded product having a heat distortion temperature higher than 100° C. consisting essentially of from 20 to 80 percent by weight of polymethyl methacrylate and from 80 to 20% by weight of xylene formaldehyde phenol resin which is produced from 100 parts by weight of xylene formaldehyde resin and from 60 parts to 150 parts by weight phenol.

18. A novel composition of matter capable of producing a molded product having a heat distortion temperature higher than 100° C. consisting essentially of from 20 to 80 percent by weight of polystyrene and from 80 to 20 percent by weight of xylene formaldehyde phenol resin which is produced from 100 parts by weight of xylene formaldehyde resin and from 60 parts to 150 parts by weight phenol.

References Cited

UNITED STATES PATENTS

| | | | |
|---|---|---|---|
| 2,825,712 | 3/1958 | Witzel | 260—844 |
| 2,954,360 | 9/1960 | Krzikalla et al. | 260—67 |
| 2,959,474 | 11/1960 | Daniels et al. | 260—844 |
| 3,165,558 | 1/1965 | Imoto et al. | 260—67 |
| 3,178,393 | 4/1965 | Brandt et al. | 260—67 |

MURRAY TILLMAN, *Primary Examiner.*

J. C. BLEUTGE, *Assistant Examiner.*